(12) United States Patent
Golan

(10) Patent No.: US 10,849,283 B2
(45) Date of Patent: Dec. 1, 2020

(54) PLANT WITH DIFFERENTIAL ALTITUDE AND DISTRIBUTED ROOT SYSTEM, ELEVATING FACADE INCLUDING A PLANT WITH DISTRIBUTED ROOT SYSTEM AND METHODS OF PRODUCING THE PLANT AND FACADE

(71) Applicant: Ezekiel Golan, Vancouver (CA)

(72) Inventor: Ezekiel Golan, Vancouver (CA)

( * ) Notice: Subject to any disclaimer, the term of this patent is extended or adjusted under 35 U.S.C. 154(b) by 59 days.

(21) Appl. No.: 14/655,389

(22) PCT Filed: Dec. 25, 2013

(86) PCT No.: PCT/IL2013/051064
§ 371 (c)(1),
(2) Date: Jun. 25, 2015

(87) PCT Pub. No.: WO2014/102784
PCT Pub. Date: Jul. 3, 2014

(65) Prior Publication Data
US 2015/0334927 A1    Nov. 26, 2015

Related U.S. Application Data

(60) Provisional application No. 61/745,785, filed on Dec. 25, 2012.

(51) Int. Cl.
*A01G 17/00*    (2006.01)
*A01G 9/02*    (2018.01)
*A01G 22/00*    (2018.01)

(52) U.S. Cl.
CPC .......... *A01G 17/005* (2013.01); *A01G 9/025* (2013.01); *A01G 22/00* (2018.02); *Y02P 60/20* (2015.11)

(58) Field of Classification Search
CPC ...... A01G 1/001; A01G 9/025; A01G 17/005; A01G 9/022; A01G 9/023; A01G 9/024;
(Continued)

(56) References Cited

U.S. PATENT DOCUMENTS

| 203,545 A | * | 5/1878 | Jenkins | A01G 1/08 256/20 |
| 344,885 A | * | 7/1886 | Viser | A01G 1/08 256/20 |

(Continued)

FOREIGN PATENT DOCUMENTS

| CN | 102047804 | 5/2011 |
| WO | WO 2012/006639 | 1/2012 |
| WO | WO 2014/102784 | 7/2014 |

OTHER PUBLICATIONS

International Preliminary Report on Patentability dated Dec. 7, 2014 From the International Preliminary Examining Authority Re. Application No. PCT/IL2013/051064.
(Continued)

*Primary Examiner* — Ebony E Evans

(57) ABSTRACT

A single plant which comprises a differential altitude and distributed root system; a foliage system; and at least one stem connecting between said root system and said foliage system. Methods of making same. Living facade including same.

25 Claims, 15 Drawing Sheets
(4 of 15 Drawing Sheet(s) Filed in Color)

(58) Field of Classification Search
CPC .......... A01G 9/12; A01G 17/00; A01G 17/04; A01G 22/00; A01G 22/67; A01G 23/04; Y02P 60/244
USPC ......... 47/5.5, 6, 7, 58, 1 R, 58.1 SE, 1.01 R, 47/1.01 T, 32.7, 32.8, 59, 60, 64
See application file for complete search history.

(56) References Cited

U.S. PATENT DOCUMENTS

| | | | | |
|---|---|---|---|---|
| 591,716 | A * | 10/1897 | Young | A01G 9/28 256/20 |
| 2,235,950 | A * | 3/1941 | St John | A01N 25/00 111/900 |
| 2,672,710 | A * | 3/1954 | Seiders | A01G 17/00 256/20 |
| 2,956,370 | A * | 10/1960 | Wieboldt Elmer F | A01G 9/024 47/67 |
| 2,988,850 | A * | 6/1961 | Hechinger | A01G 17/00 256/20 |
| 3,012,372 | A * | 12/1961 | Hechinger | A01G 7/00 47/58.1 R |
| 4,161,085 | A * | 7/1979 | Moffett, Jr. | A01G 9/022 47/67 |
| 4,336,667 | A * | 6/1982 | Evans | A01G 17/06 47/1.01 R |
| 4,345,403 | A * | 8/1982 | Giovannetti | A01G 1/048 435/430 |
| PP5,047 | P * | 5/1983 | Garabedian | |
| 4,457,102 | A * | 7/1984 | Ploeger, Jr. | A01G 17/00 111/102 |
| 4,550,528 | A * | 11/1985 | Mehra-Palta | A01G 7/00 435/430 |
| 4,581,846 | A * | 4/1986 | Stensaas | A01G 29/00 47/1.1 |
| 4,589,225 | A * | 5/1986 | Stensaas | A01G 29/00 47/57.6 |
| 4,896,456 | A * | 1/1990 | Grant | A01G 9/024 47/67 |
| 4,961,284 | A * | 10/1990 | Williams | A01G 9/022 47/66.5 |
| 4,993,184 | A * | 2/1991 | Howe | A01G 9/12 47/4 |
| 5,257,476 | A * | 11/1993 | Fukuzumi | A01G 9/025 47/65.8 |
| 5,393,426 | A * | 2/1995 | Raskin | C02F 3/327 210/602 |
| 5,584,140 | A * | 12/1996 | Byrne | A01G 7/00 47/58.1 R |
| 5,615,519 | A * | 4/1997 | Abe | A01G 1/00 47/58.1 R |
| 6,470,625 | B1 * | 10/2002 | Byun | A01G 9/023 47/82 |
| 6,804,912 | B2 * | 10/2004 | van Weel | A01G 7/00 47/58.1 R |
| 7,328,532 | B2 * | 2/2008 | Golan | A01G 9/12 47/32.8 |
| 7,627,983 | B1 * | 12/2009 | Deutsch-Aboulmahassine | A01G 9/025 47/65.5 |
| 7,832,144 | B2 * | 11/2010 | Corradi | A01G 31/02 47/59 S |
| 7,941,967 | B2 * | 5/2011 | Jolley | A01G 9/12 47/39 |
| 7,984,585 | B1 * | 7/2011 | Wu | A01G 9/12 47/45 |
| 8,122,642 | B1 * | 2/2012 | Huberman | A01G 31/001 47/59 S |
| 9,351,448 | B2 * | 5/2016 | Mackenzie | A01G 9/025 |
| 2006/0096168 | A1 * | 5/2006 | Golan | A01G 7/00 47/4 |
| 2008/0110086 | A1 * | 5/2008 | Julia | A01G 9/025 47/64 |
| 2009/0199473 | A1 * | 8/2009 | Watson, Jr. | A01G 31/001 47/65.7 |
| 2009/0277081 | A1 * | 11/2009 | Georges | A01G 13/0243 47/6 |
| 2010/0212557 | A1 * | 8/2010 | Tien | A01G 2/00 111/100 |
| 2012/0102832 | A1 * | 5/2012 | Baron | A01G 17/005 47/66.7 |
| 2012/0124687 | A1 * | 5/2012 | Wipff | A01H 5/12 800/260 |
| 2014/0075604 | A1 * | 3/2014 | Volterrani | A01C 11/00 800/298 |

OTHER PUBLICATIONS

International Search Report and the Written Opinion dated Mar. 24, 2014 From the International Searching Authority Re. Application No. PCT/IL2013/051064.

Koehler "Green Facades—A View Back and Some Visions", Urban Ecosystems, 11(4): 423-436, Dec. 31, 2008. Abstract.

Koushafar et al. "Effect of Dynamic Unequal Distribution of Salts in the Root Environment on Performance and Crop Per Drop (CPD) of Hydroponic-Grown Tomato", Scientia Horticulturae, 131: 1-5, Dec. 31, 2011. Abstract. Abstract.

Weinmaster "Are Green Walls as 'Green' as They Look? An Introduction to the Various Technologies and Ecological Benefits of Green Walls", Journal of Green Building, 4(4): 3-18, Fall 2009. Abstract. Abstract.

* cited by examiner

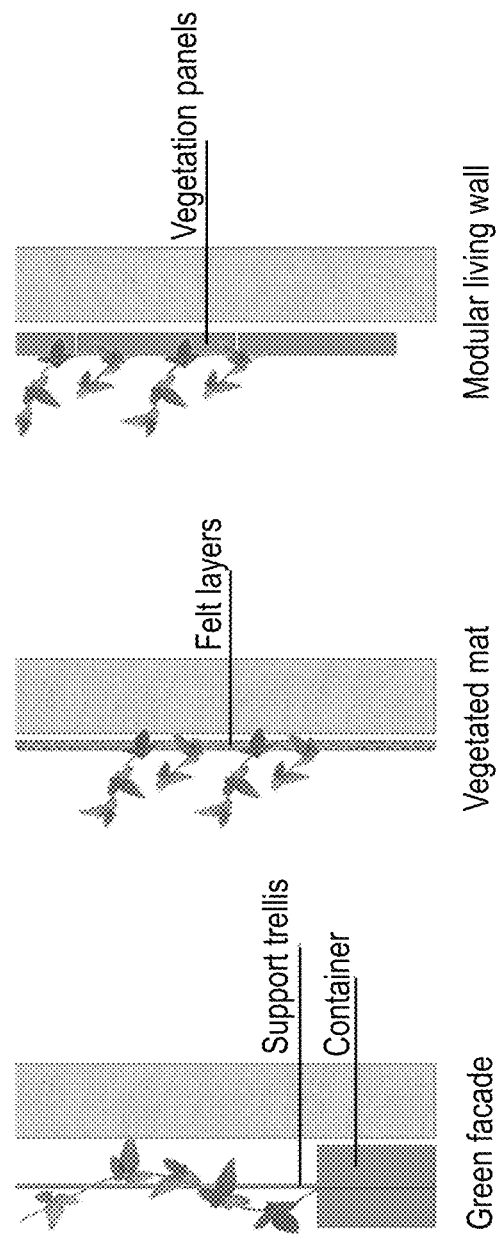

PLANT WITH DIFFERENTIAL ALTITUDE AND DISTRIBUTED ROOT SYSTEM, ELEVATING FACADE INCLUDING A PLANT WITH DISTRIBUTED ROOT SYSTEM AND METHODS OF PRODUCING THE PLANT AND FACADE

RELATED APPLICATIONS

This application is a National Phase of PCT Patent Application No. PCT/IL2013/051064 having International filing date of Dec. 25, 2013, which claims the benefit of priority under 35 USC § 119(e) of U.S. Provisional Patent Application No. 61/745,785 filed on Dec. 25, 2012. The contents of the above applications are all incorporated by reference as if fully set forth herein in their entirety.

FIELD AND BACKGROUND OF THE INVENTION

The present invention, in some embodiments thereof, relates to a plant, e.g., a tree, with differential altitude and distributed root system. The present invention, in some embodiments thereof, further relates to an elevating facade, e.g., a wall, which is covered, at least in part, by a plant with a distributed root system, thereby generating a living facade, e.g., a living wall, carrying the plant with a distributed root system thereon. The present invention, in some embodiments thereof, further relates to methods of producing the plant and the living facade.

Under typical growth conditions, a plant of any given species develops root and foliage systems of a characteristic evolutionary predetermined size before flowering and/or fruiting. A plant is considered a mature plant when its root and foliage systems have reached the characteristic evolutionary predetermined size.

From an evolutionary perspective, in order to increase its chances of survival, under stress conditions, a plant may flower and produce fruits even before its root and/or foliage systems reached their characteristic evolutionary predetermined size.

For a similar reason a mature plant may skip flowering and/or fruiting in a certain year due to biotic or abiotic stress conditions, so as to allocate the limited resources available that year to survival as opposed to reproduction and delay reproduction to years when the stress is relieved.

Living walls, vertical vegetation, green facades, wall gardens, etc., are all phrases describing non horizontal structural elements formed with surfaces (typically vertical surfaces) that physically support the growth of vegetation thereon, or adjacent thereto.

Often times, the following terminology is used in the art to describe elevating vegetation:

1. The phrase "green facade" is often used in the art to describe vines and climbers that grow from the ground or from large containers at various locations on the exterior of structures. The climbers are supported either by the wall itself (the traditional green facade) or by a supporting trellis/mesh. An illustration of a green facade is shown in FIG. 1A (prior art).

2. The phrase "living wall" is often used in the art to describe plants that grow from a vertical layer of a growing medium. Within the living wall category, some of the architectures are based on plants growing hydroponically, typically planted in layers of synthetic felt, therefore called "vegetated mat". An illustration of a living wall in the form of a vegetated mat is shown in FIG. 1B (prior art).

3. Other living walls are based on panels or pockets filled with a more traditional growing medium (e.g., potting mix). These architectures are oftentimes called "panel system", "pocket system" or modular living walls. An illustration of a modular living wall is shown in FIG. 1C (prior art).

It is to be understood that the nomenclature characterizing the art to which this invention relates is constantly developing and the phrases used above should not be deemed limited by the above descriptions.

Under the preferred embodiments section that follows, the reader shall find definitions for the terminology and lexicography which is exploited throughout the current document in order to describe the present invention.

To date, the practice of growing plants on walls is limited to plants with relatively small root systems, because root space is seriously limited by the space made available by living wall architectures.

As a result, trees are rarely grown over walls, let alone flowering and fruiting trees. When trees are grown on walls, in order to reach maturity they require massive containers formed in, or attached to, the wall in order to allow the tree to develop a root system of sufficient functional size to support a mature foliage system, flowering and fruiting. Failing to provide such conditions may result in poorly and immature appearing trees.

The present invention provides a novel insight to the elevated vegetation art, which allows to overcome the limitations imposed by limited root space.

SUMMARY OF THE INVENTION

According to an aspect of some embodiments of the present invention there is provided a single plant comprising a differential altitude and distributed root system; a foliage system; and at least one stem connecting between the root system and the foliage system.

According to an aspect of some embodiments of the present invention there is provided a living facade comprising a surface and a single plant which comprises a distributed root system, optionally, differential altitude and distributed root system; a foliage system; and at least one stem connecting between the root system and the foliage system.

According to an aspect of some embodiments of the present invention there is provided a method of generating a plant having a differential altitude and distributed root system, the method comprising obtaining a plant having a root cluster in a first confinement; inducing a structure of the plant to generate an additional root cluster in a second confinement, the first confinement and the second confinement being at different altitudes, thereby generating a plant having a differential altitude and distributed root system.

According to an aspect of some embodiments of the present invention there is provided a method of generating a plant having a differential altitude and distributed root system, the method comprising obtaining a first plant having a first root cluster in a first confinement; obtaining a second plant having a second root cluster in a second confinement; inducing a portion of a structure of the first plant to functionally fuse to a portion of a structure of the second plant, the first confinement and the second confinement being at different altitudes, thereby generating a plant having a differential altitude and distributed root system.

According to another aspect of some embodiments of the present invention, there is provided a method of generating a plant having a plurality of differential altitudes and distributed root system, the method comprising generating a plant having differential altitudes and distributed root system according to the methods of the invention, and repeating the steps of the method with the plant in the first or the second confinement, or both, with a plurality of additional plants having root clusters in a plurality of confinements, thereby generating a plant having a plurality of differential altitudes and distributed root system.

Optionally, the method according to this aspect of the invention comprises inducing the additional root cluster to generate a stem and foliage. According to an aspect of some embodiments of the present invention there is provided a method of generating an elevating living facade, the method comprising growing at least one plant having a distributed root system over or adjacent to a surface of an elevating facade, thereby generating the elevating living facade.

According to an aspect of some embodiments of the present invention there is provided a living facade which comprises a surface and at least one single plant grown on or adjacent to said surface, said single plant comprises: a distributed root system, optionally differential altitude and distributed root system; a foliage system; and at least one stem connecting between said root system and said foliage system.

According to some embodiments of the invention the structure is selected from the group consisting of a root, a stem and a shoot.

According to some embodiments of the invention the portion of the structure is in vascular connection with the structure.

According to some embodiments of the invention the structure of the first plant is a root and the structure of the second plant is a root.

According to some embodiments of the invention the structure of the first plant is a root and the structure of the second plant is a shoot.

According to some embodiments of the invention the structure of the first plant is a root and the structure of the second plant is a stem.

According to some embodiments of the invention the structure of the first plant is a shoot and the structure of the second plant is a shoot.

According to some embodiments of the invention the structure of the first plant is a shoot and the structure of the second plant is a root.

According to some embodiments of the invention the structure of the first plant is a shoot and the structure of the second plant is a stem.

According to some embodiments of the invention the structure of the first plant is a stem and the structure of the second plant is a stem.

According to some embodiments of the invention the structure of the first plant is a stem and the structure of the second plant is a root.

According to some embodiments of the invention the structure of the first plant is a stem and the structure of the second plant is a shoot.

According to some embodiments of the invention the distributed root system is contained in a plurality of distributed confinements, the confinements are attached to or integrally formed with or in or on the surface.

According to some embodiments of the invention the distributed root system is a differential altitude and distributed root system.

According to some embodiments of the invention the distributed confinements are differential altitude distributed confinements.

According to some embodiments of the invention, the foliage system is a distributed foliage system.

According to some embodiments of the invention, the foliage system is a differential altitude and distributed foliage system.

According to some embodiments of the invention, the differential altitude and distributed root system is contained in a plurality of differential altitude and distributed confinements, the confinements attached to or integrally formed with or in or on the surface.

According to some embodiments of the invention, the living facade is formed on a wall.

According to some embodiments of the invention, the wall is a part of a man made structure.

According to some embodiments of the invention, the plant is a tree.

According to some embodiments of the invention, the tree is a fruit tree.

According to some embodiments of the invention, the fruit tree is selected from the group consisting of *Vitis* spp. AKA Grape vines, *Malus* spp., in particular *Malus domestica*, AKA Apple, *Prunus* spp., AKA Peach, Plum, Cherry, Apricot, *Pyrus* spp. AKA Pear, *Vaccinium* spp., AKA Blueberry, Cranberry, Bilberry, *Ribes* spp., AKA currants e.g. Blackcurrant, Redcurrant, *Asimina* sp., AKA Pawpaw, *Punica* spp., AKA Pomegranate, *Ficus* sp., AKA Fig, *Diospyros* spp., AKA Persimmon, *Olea* spp., AKA Olive.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 2A:
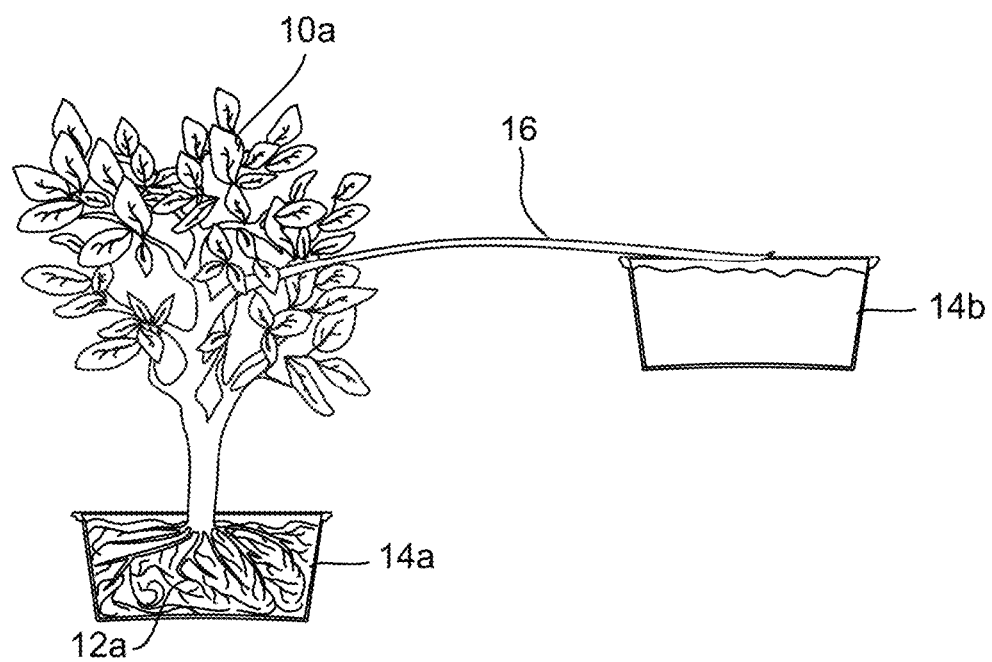
Figure 2B:
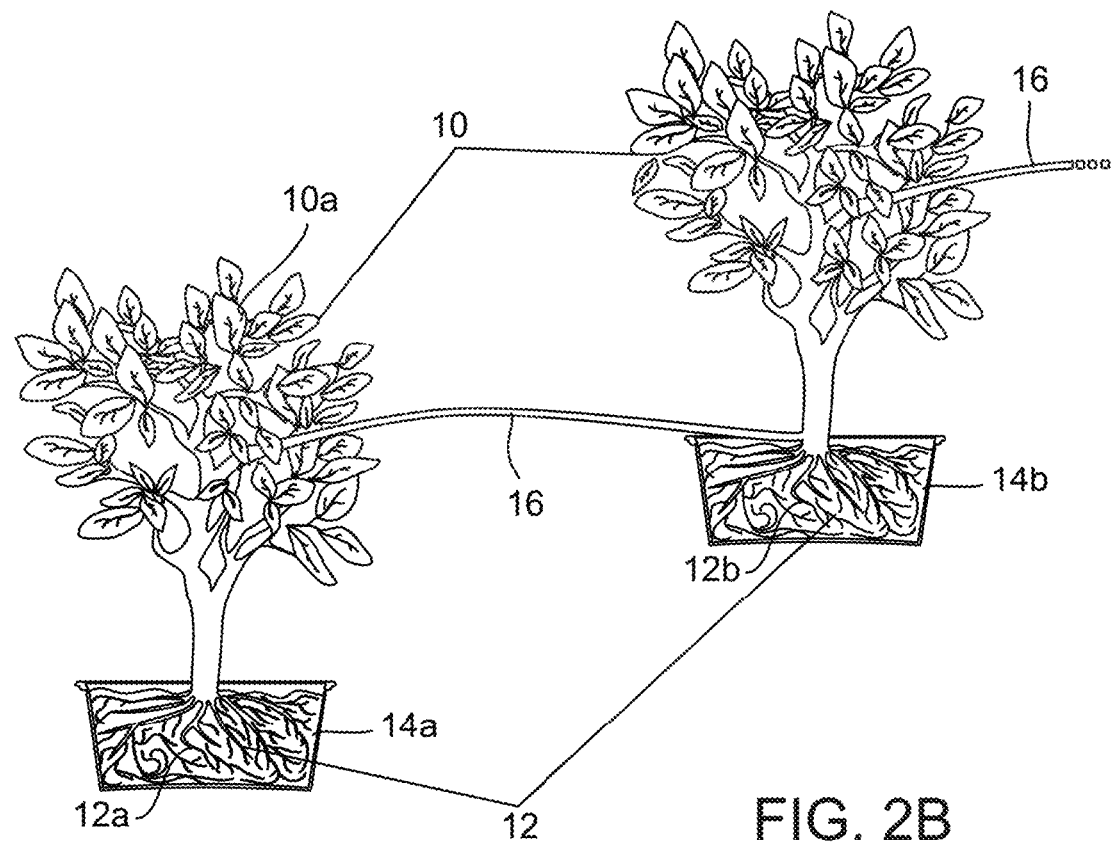
Figure 3A:
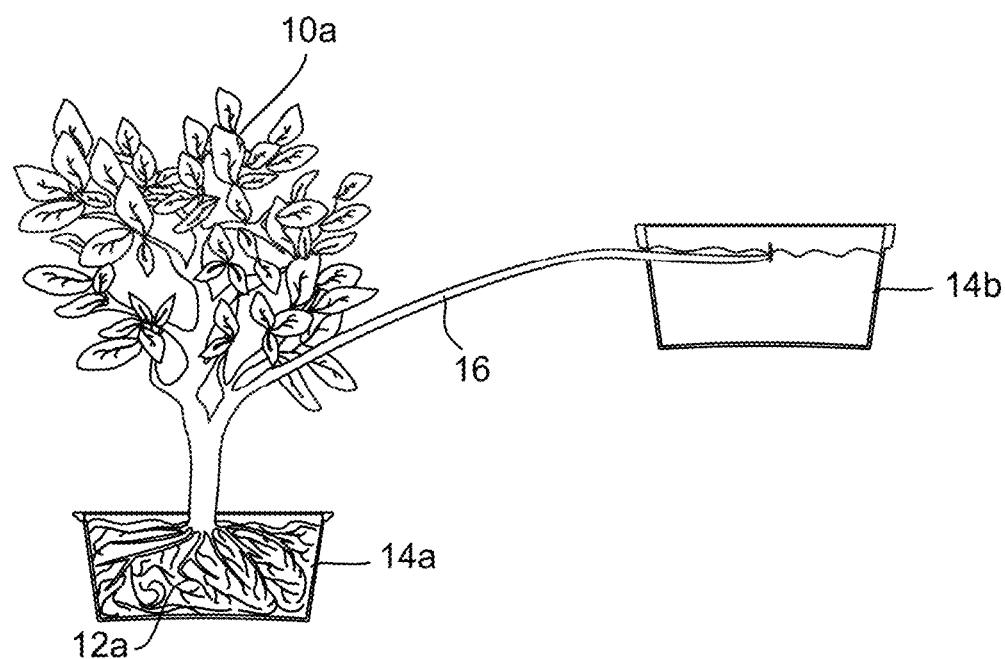
Figure 3B:
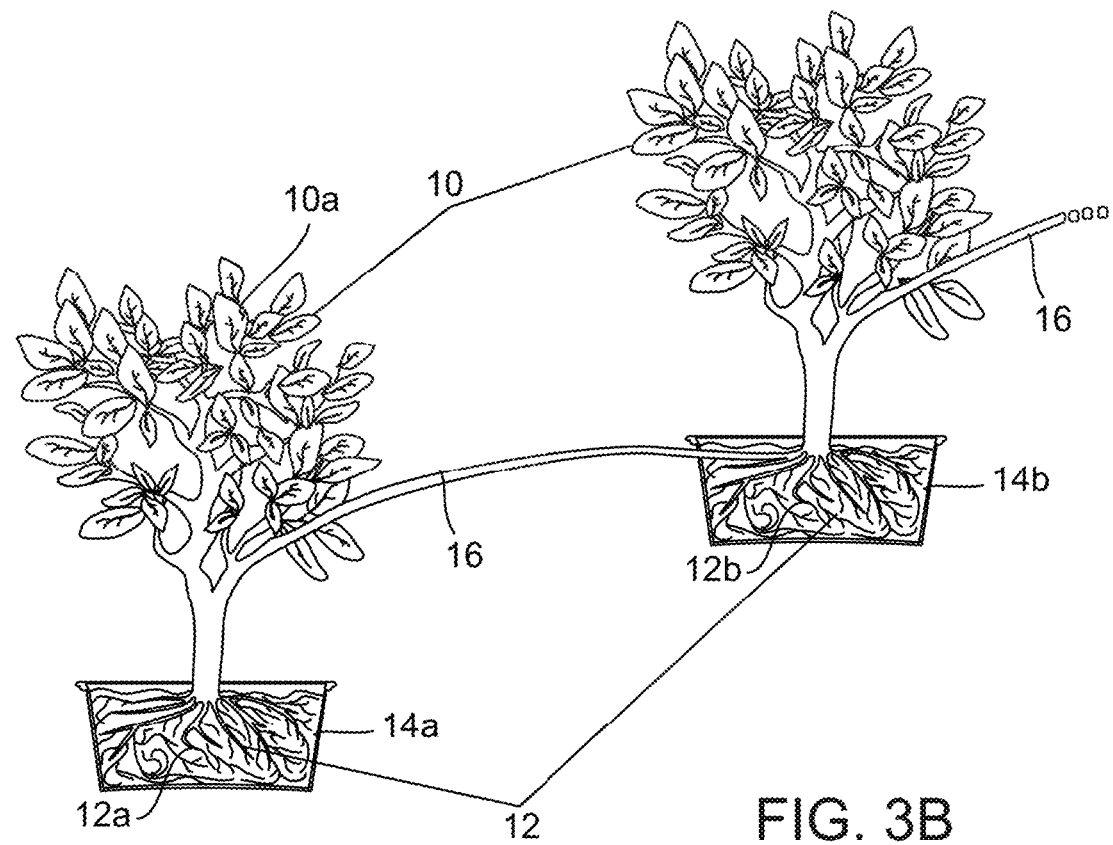
Figure 4A:
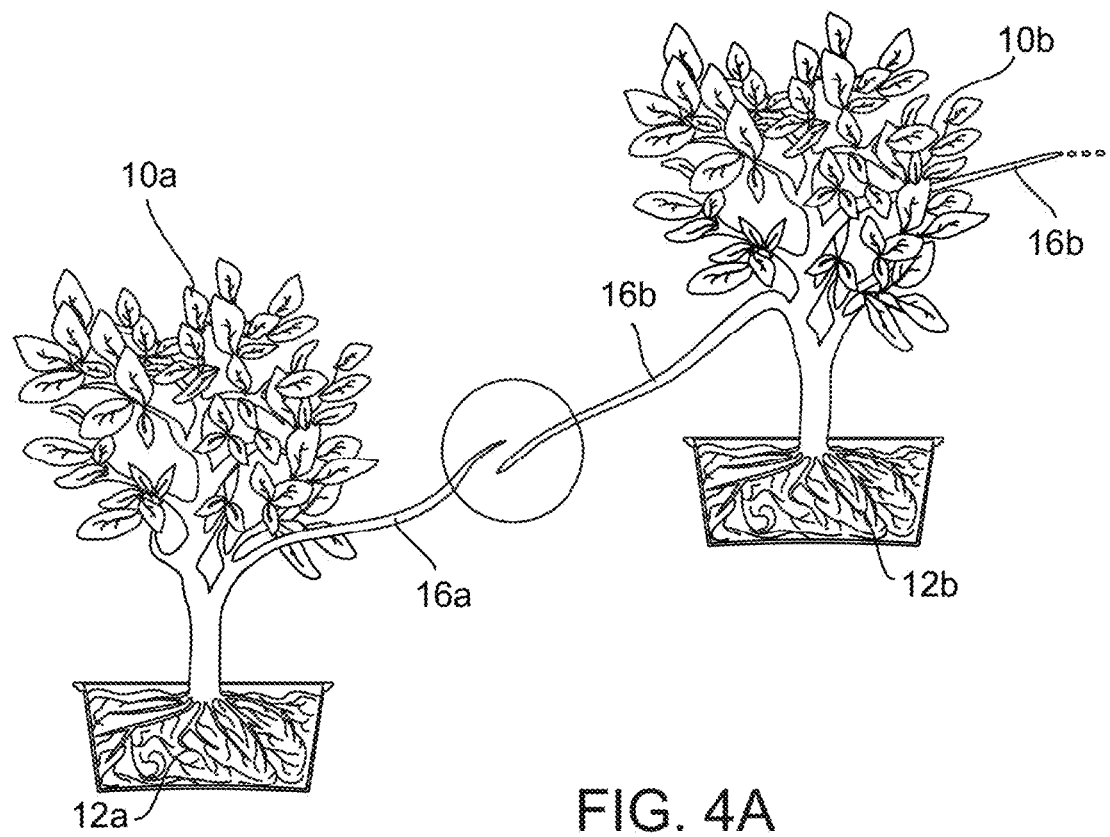
Figure 4B:
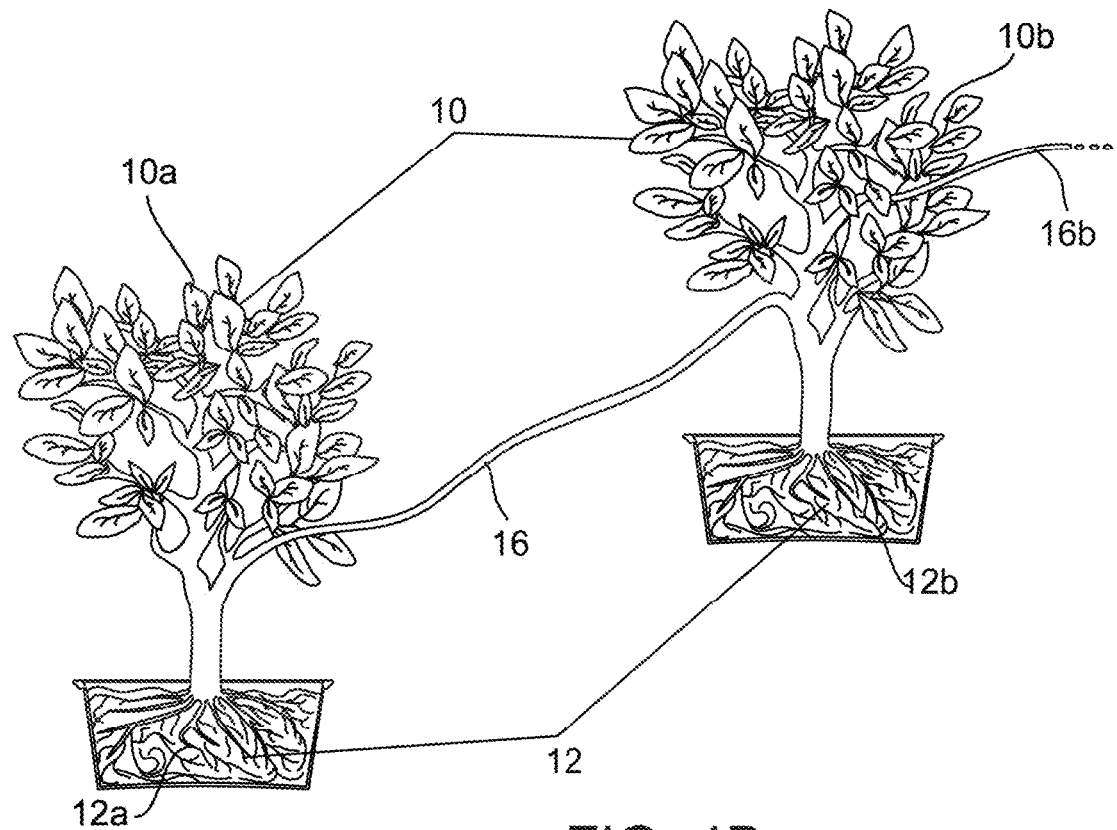
Figure 5A:
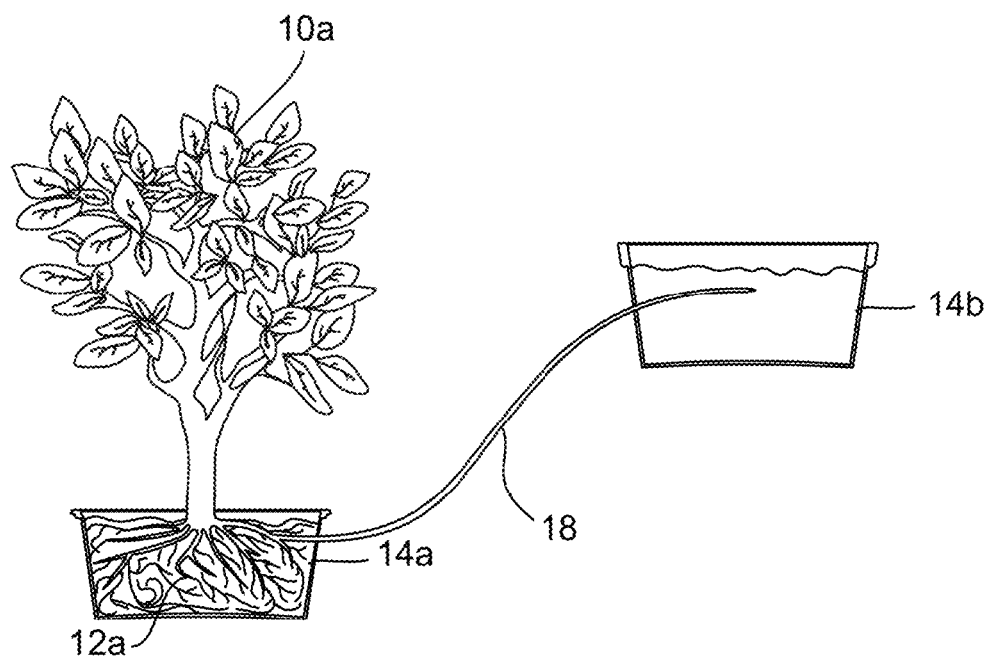
Figure 5B:
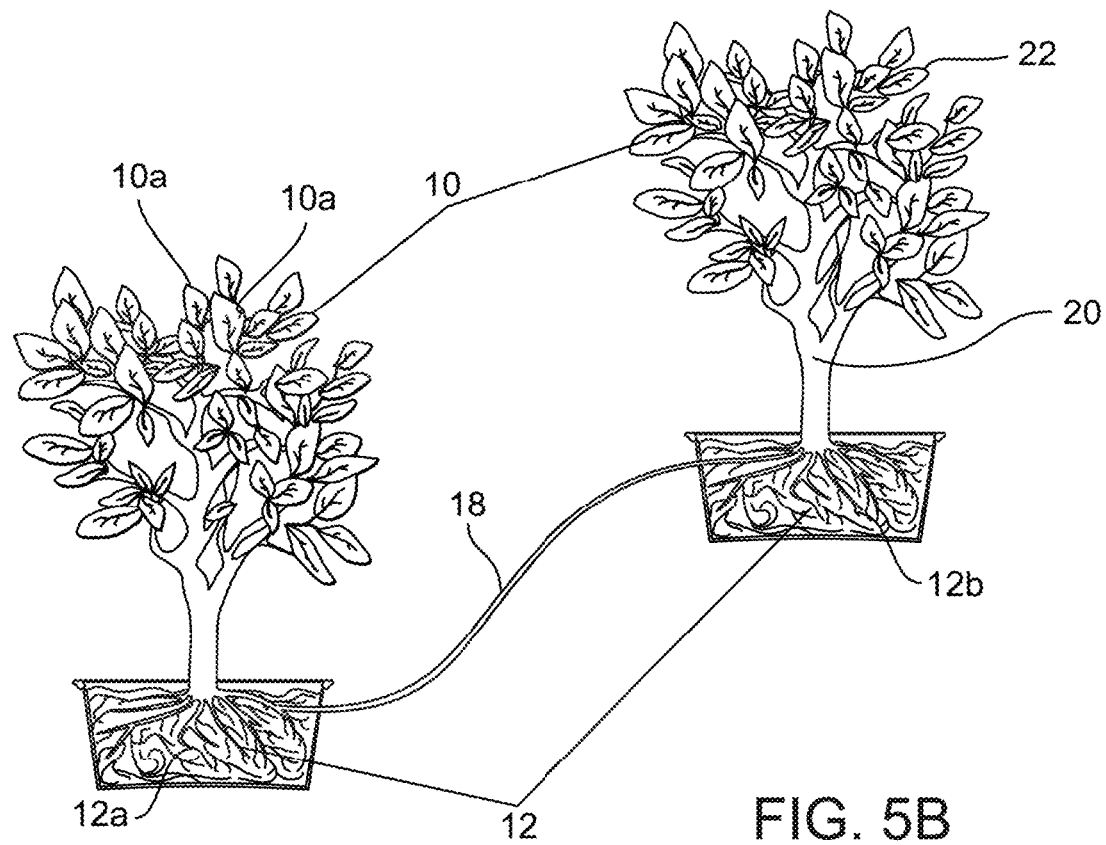
Figure 6A:
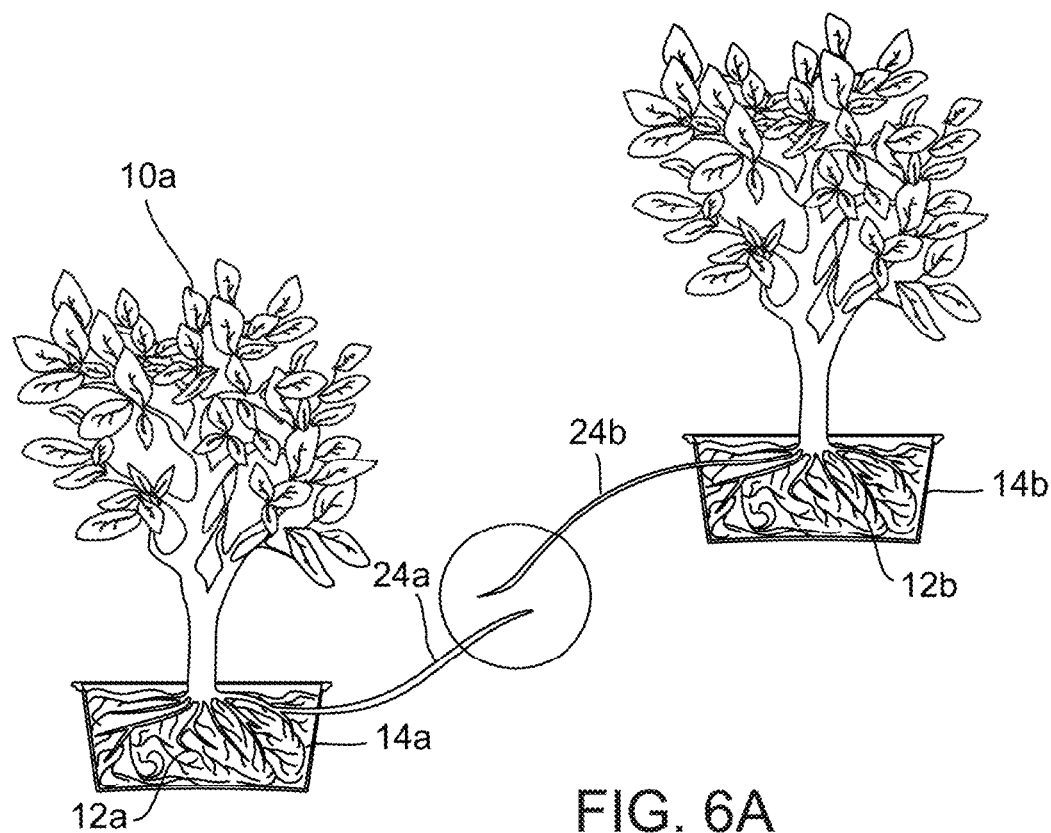
Figure 6B:
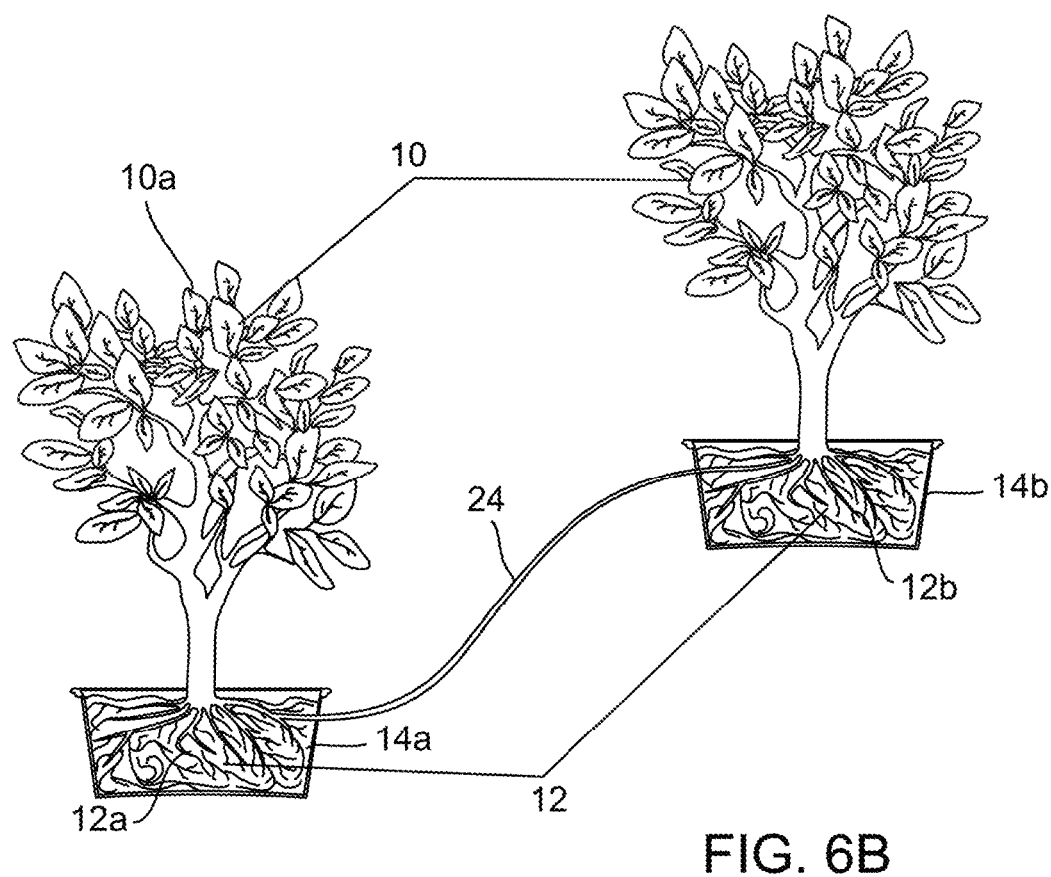
Figure 7A:
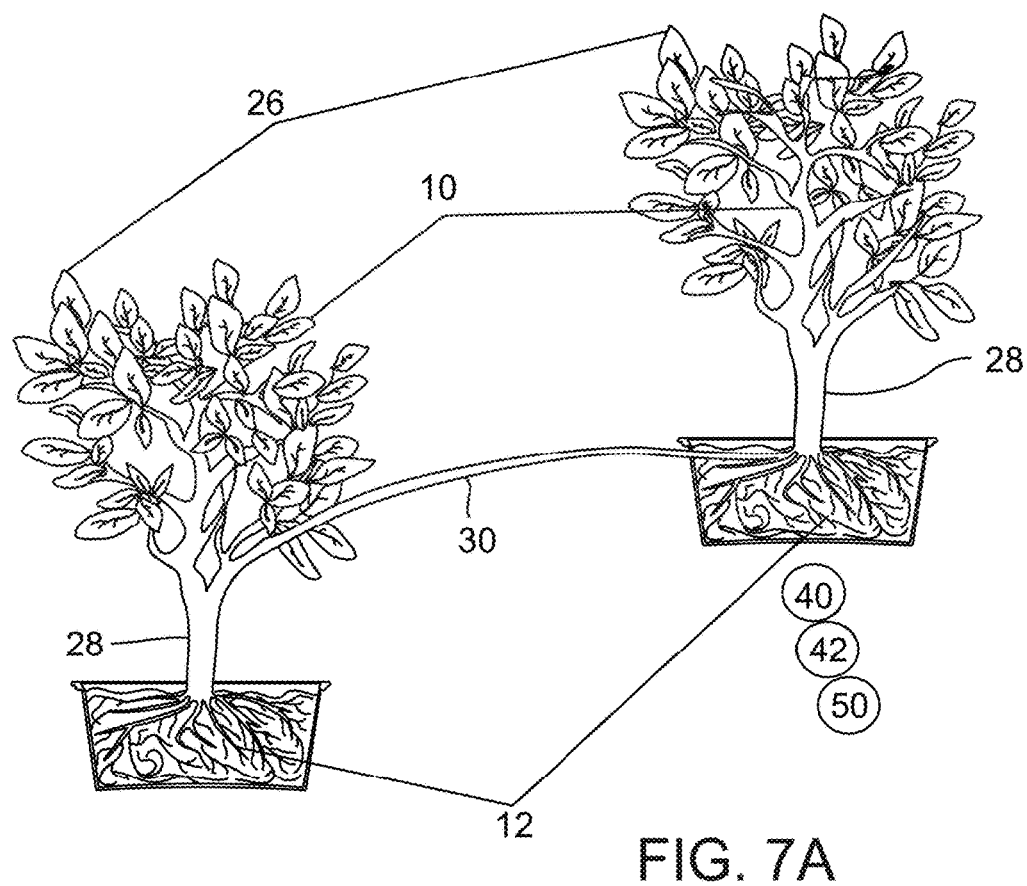
Figure 7B:
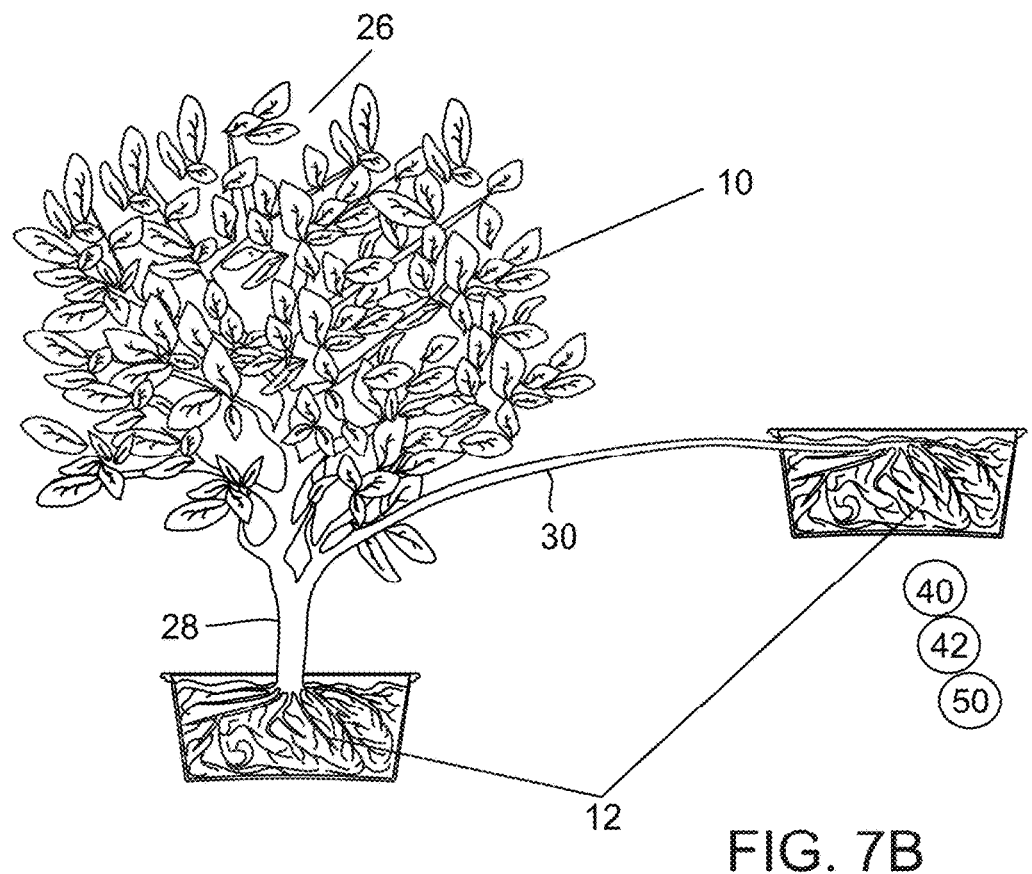
Figure 8A:
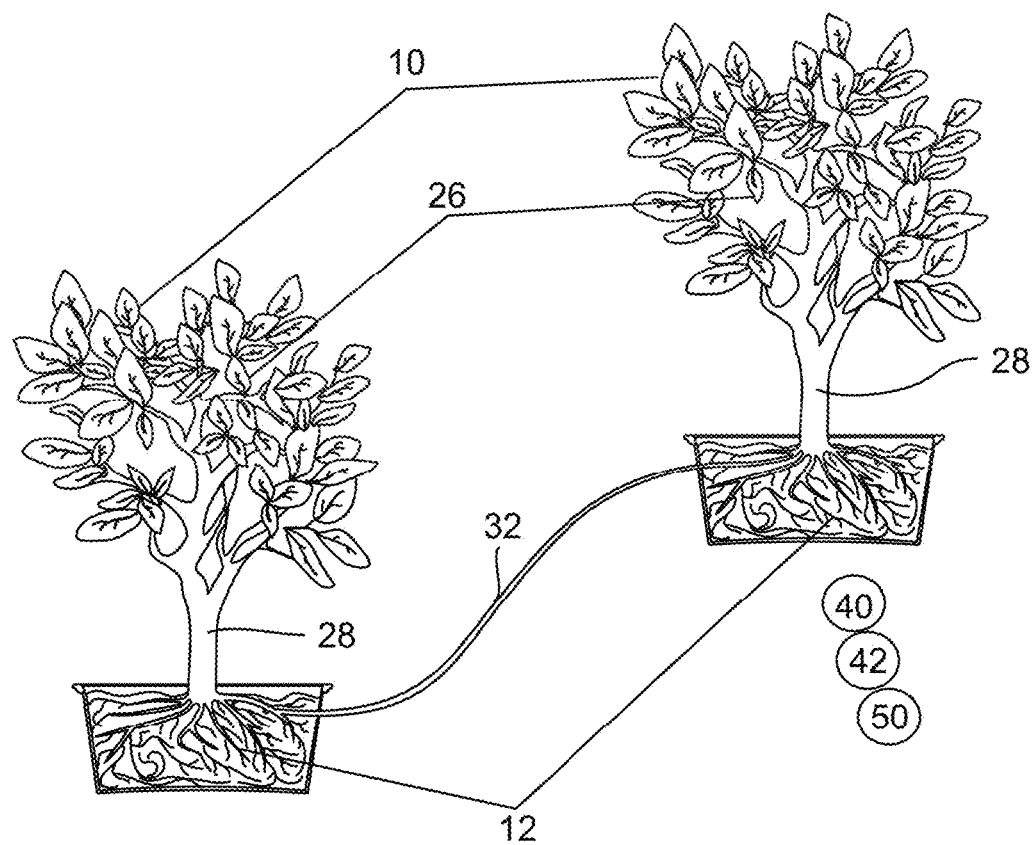
Figure 8B:
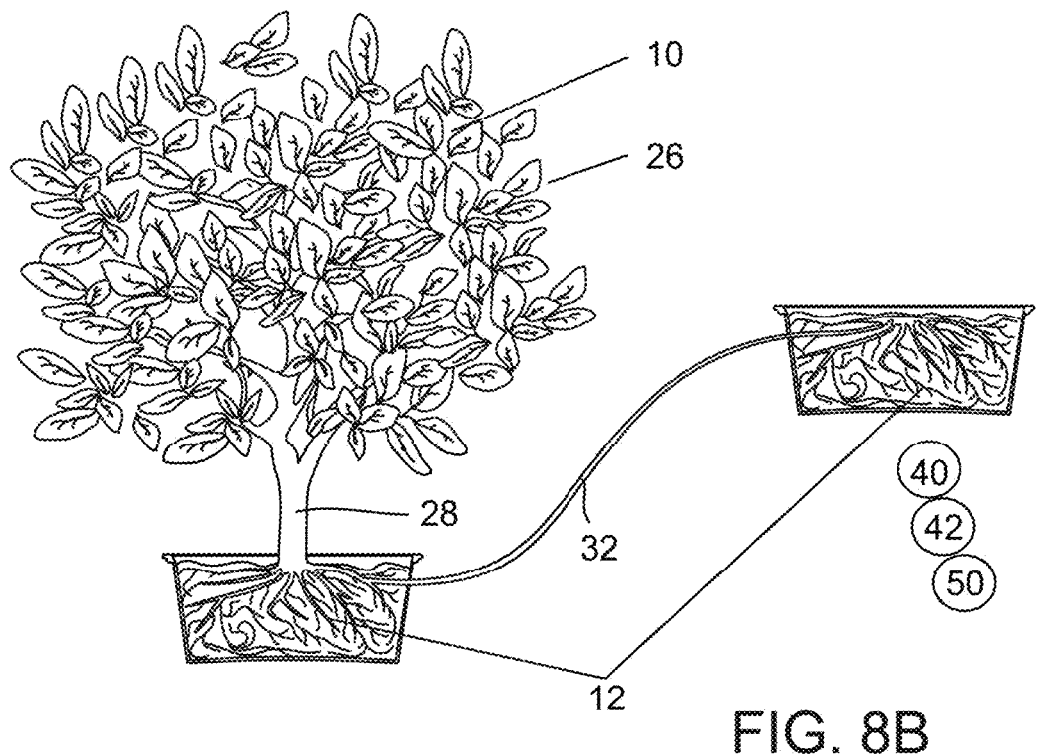
Figure 9:
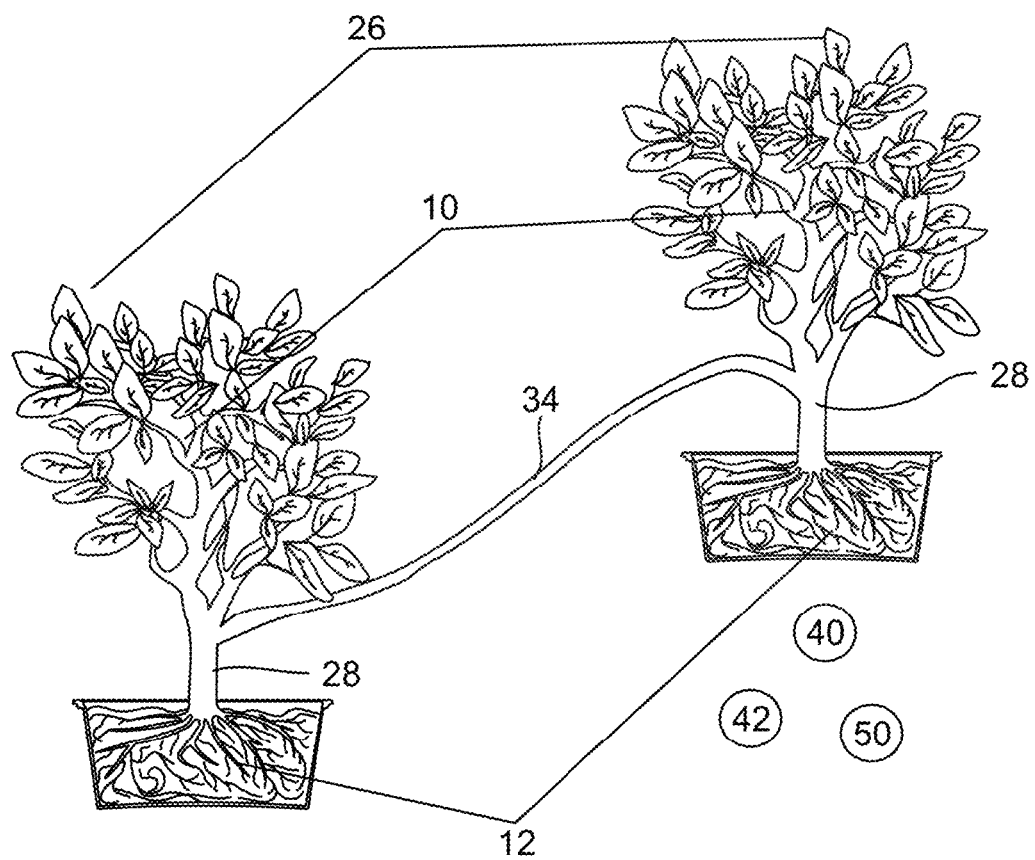
Figure 10A:
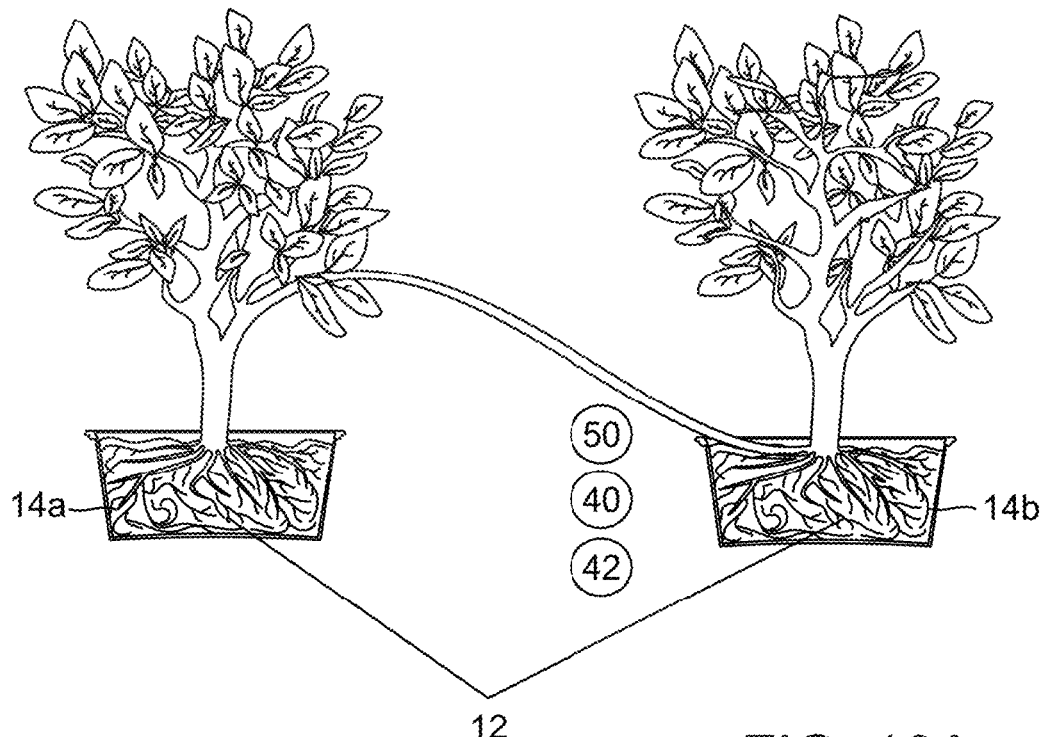
Figure 10B:
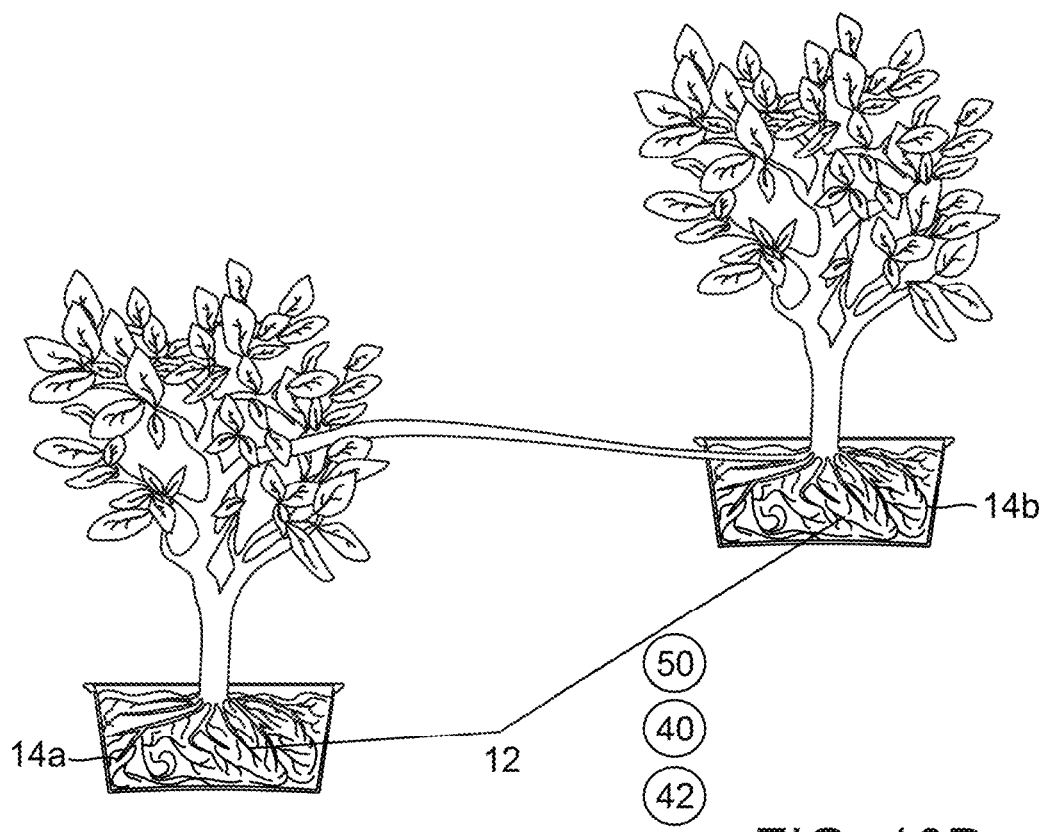
Figure 11:
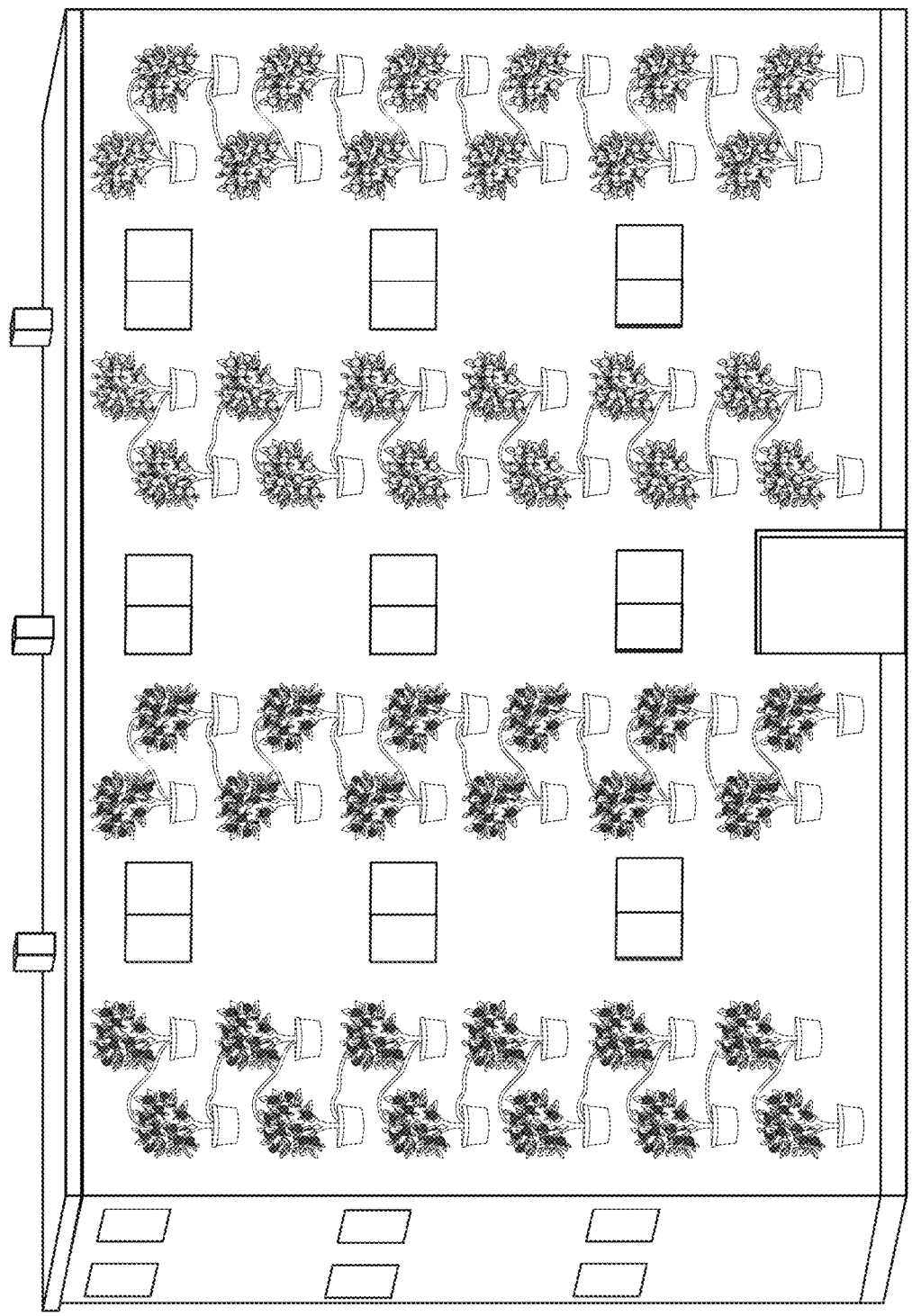

FIGS. 1A-C are prior art illustrations of a green facade, a living wall in the form of a vegetated mat; and a modular living wall, respectively;

FIGS. 2A-B are illustrations of a method of generating a plant having a differential altitude and distributed root system according to an embodiment of the present invention;

FIGS. 3A-B are illustrations of another method of generating a plant having a differential altitude and distributed root system according to an embodiment of the present invention;

FIGS. 4A-B are illustrations of another method of generating a plant having a differential altitude and distributed root system according to an embodiment of the present invention;

FIGS. 5A-B are illustrations of another method of generating a plant having a differential altitude and distributed root system according to an embodiment of the present invention;

FIGS. 6A-B are illustrations of another method of generating a plant having a differential altitude and distributed root system according to an embodiment of the present invention;

FIGS. 7A-B are illustrations of plants according to some embodiments of the present invention;

FIGS. 8A-B are illustrations of plants according to some embodiments of the present invention;

FIG. 9 is an illustration of a plant according to an embodiment of the present invention;

FIGS. 10A-B are illustrations of living facades according to some embodiments of the present invention; and FIG. 11 is an illustration of a facade of a building according to an embodiment of the present invention.

FIGS. 12A-12D are photographs of plants according to some embodiments of the present invention.

DESCRIPTION OF SPECIFIC EMBODIMENTS OF THE INVENTION

The present invention, in some embodiments thereof, relates to a plant, e.g., a tree, with differential altitude and distributed root system, which can be used in elevated vegetation applications. The present invention, in some embodiments thereof, further relates to an elevating facade, e.g., a wall, which is covered, at least in part, by a plant with a distributed root system, e.g., differential altitude and distributed root system, thereby generating a living facade, e.g., a living wall, carrying thereon the plant with the distributed root system. The present invention, in some embodiments thereof, further relates to methods of producing the plant and the living facade.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The following terms and phrases are used herein to describe the present invention.

The term "facade" is used herein to describe a face of a natural (e.g., hill of cliff side) or man-made (e.g., an external or an internal wall of a building) structure.

The phrase "elevating facade" is used herein to describe a facade which is not horizontal. Typically an elevating facade forms an angle of between 30-90 or 40-90 or 50-90 or 60-90 or 70-90 or 80-90 or about 90 or 90 degrees with the horizon. In the latter case, the facade is a vertical facade, namely, orthogonal to the horizon.

The term "about" is used herein to indicate +/−5% of a specified value.

The phrase "elevating vegetation" is used herein to describe vegetation grown over the surface of an elevating facade. When the elevating facade is a vertical facade, the elevating vegetation is vertical vegetation.

The term "plant" is used herein to describe an organism of the kingdom plantae.

The phrase "single plant" is used herein to describe a single organism. By "single organism" it is meant that any cell or natural structure of the organism is connected directly or indirectly (via other cells and natural structures) to all other cells or natural structures of the organism. A single plant or a single organism according to the invention may have more than a single genetic or species origin, as it may be the case, e.g., in grafted or artificially inosculated trees. All parts of a single plant according to the invention share commonly functional vasculature (xylem and phloem). In some embodiments of the invention the plant is a tree, e.g., a fruit tree.

The phrase "root system" is used herein to describe the entire underground root structure of a single plant.

The phrase "foliage system" is used herein to describe the entire aboveground foliage structure of a single plant.

The phrase "flowering and/or fruiting supporting root system" is used herein to describe a root system which is sufficiently sized to support flowering and/or fruiting, respectively, of a plant under typical growth conditions.

The phrase "flowering and/or fruiting supporting foliage system" is used herein to describe a foliage system which is sufficiently sized to support flowering and/or fruiting, respectively, of a plant under typical growth conditions.

The phrase "typical growth conditions" is used herein to describe growth conditions which are sufficiently non-stressful so as not to induce plant "pre-death" flowering and/or fruiting.

The phrase "distributed root system" is used herein to describe a root system with is partitioned into at least two or more spatially separated root aggregates or clusters. A root cluster according to the invention is typically smaller in size as compared to a mature root system of the same plant. Under typical growth conditions, a root cluster according to the invention is too small to support flowering and/or fruiting of the plant. The size of a root cluster according to the invention is limited by the confinement in which it is contained. It will be appreciated that the present invention is useful, for example, in cases where a natural size of a root system of a plant requires more soil volume than what is offered by a single confinement.

The term "confinement" is used herein to describe a restricted space available for root growth. The confinement may be a container formed in or on an elevating facade.

The phrase "differential altitude and distributed root system" is used herein to describe a root system with is partitioned into at least two or more spatially separated root aggregates or clusters, wherein at least two of said aggregates or clusters are at a different altitude. The differential altitude and distributed root system is typically allowed to grow to a combined size which is equal to or larger than a mature root system of the same plant when grown on land.

The phrase "plant structure" is used herein to describe a portion of the plant anatomy which is characterized by morphological, functional and developmental parameters. Plant structures, as used herein, include, but are not limited to "root", "stem" and "shoot". Roots, stems and shoots are all vascular structures, with stems and shoots, but not roots being node-bearing structures.

The term "root" is used herein to describe the non-leaf, non-node-bearing part of a plant.

The term "stem" is used herein to describe the stalk of a plant or the main trunk of a tree. A stem may include but is not limited to: stalk, stock, shoot, trunk and axis.

The term "shoot" is used herein to describe new plant growth that can grow from seed or axillary buds. A shoot may include but is not limited to: branch, bough, growth, offshoot, sprig and scion. Both stems and shoots are node-bearing plant structures.

Typically the plant root is positively gravitropic, in contact with the growth medium and located below the soil surface, while the stem and/or shoot is typically negatively gravitropic, above the soil surface and exposed to the air. However, under certain circumstances, portions of the root cluster may develop above the soil surface (for example, aerial roots), and portions of the shoot or stem may grow horizontally at the soil surface or just below it (for example, stolons or runners), or not only horizontally but at a different orientation (vertically or obliquely) to the soil surface (for example, "rhizomes").

The phrase "a portion of a plant structure" is used herein to describe a subdivision of the plant structure. Roots, stems and shoots of most plants and trees comprise complex and diverse outgrowths for example, a branch of a limb or bough, or a sprig of a shoot, primary and adventitious roots, or other subdivisions of the root cluster and specialized stem growths such as bulbs. Thus, the methods of the present invention can be performed using an entire plant structure, such as a shoot or a stem, or any portion or subdivision (natural or artificially formed) of the structure (for example, a few individual roots of the root cluster and the like), with the proviso that the structure have the capability of forming a vascular connection with the other, spatially separated root aggregates or clusters of the distributed root cluster.

According to the invention, the size of a root system is limited by the size and number of the confinements in which it grows, and since the number of confinements is readily increasable, root systems of any size can be grown. Thereby, allowing the growth of large trees.

The phrase "distributed foliage system" is used herein to describe a foliage system with is partitioned into at least two or more spatially separated foliage aggregates or clusters.

The phrase "differential altitude and distributed foliage system" is used herein to describe a foliage system with is partitioned into at least two or more spatially separated foliage aggregates or clusters, wherein at least two of said aggregates or clusters are at a different altitude.

The phrase "plant cluster" is used herein to describe an aggregate of plant organs including at least a clustered root system and optionally also a stem and a clustered foliage system or a non-segregated foliage system.

The phrase "living facade" is used herein to describe a facade at least partially covered by a plant or plants.

The phrase "living wall" is used herein to describe a wall at least partially covered by plant or plants.

Under typical growth conditions, a plant, e.g., a tree, under typical growth conditions, must reach maturity prior to flowering and fruiting. Plant maturity in this context greatly depends on a suitable size of the root system of the plant. Plant maturity in this context may also greatly depend on a suitable size of the foliage system of the plant.

In vertical vegetation, confinement size severely limits the size of the root system that can develop therein, thereby limiting the size of the foliage, which, under typical growth conditions is correlated to the size of the root system.

The inventor of the present invention realized that a plant having a distributed root system may be used to allow a single plant to develop a plurality of distributed root clusters that collectively form a root system of a size sufficient to support flowering and/or fruiting of the plant under typical growth conditions. The plurality of root clusters may be contained in a plurality of confinements formed in or on an elevating facade, thereby rendering moot the confinement size limitation that characterizes the prior art and which thus far practically prevented vertical vegetation of larger plants such as trees, e.g., fruit trees.

The inventor of the present invention has developed numerous methods of generating a plant having a distributed root system, e.g., a differential altitude and distributed root system for use in context of the invention. These methods are described below, followed by a description of the plants generated there from and the facades that make use thereof.

Thus, as shown in FIGS. 2A-3B, according to an aspect of some embodiments of the present invention there is provided a method of generating a plant 10. Plant 10 has a differential altitude and distributed root system 12. The method according to this aspect of the invention comprises planting a plant 10a having a root cluster 12a in a first confinement 14a. The method according to this aspect of the invention further comprises inducing a branch 16 of plant 10a to generate an additional root cluster 12b in a second confinement 14b. First confinement 14a and second confinement 14b are at different altitudes. As a result, a plant 10, having a differential altitude and distributed root system 12, is generated. In FIGS. 2A-B branch 16 is induced to generate root cluster 12b via air layering (also known as marcotting), whereas in FIGS. 3A-B branch 16 is induced to generate root cluster 12b via soil layering.

Figure 12A:
Figure 12B:

FIGS. 12A-12D are photographs of actual plants having a differential altitude and distributed root system generated according to the methods of some embodiments of the present invention. FIG. 12A shows an actual fruit tree (*Punica* spp, AKA pomegranate) in a lower confinement, with a shoot (a branch) of the tree being induced to develop a root cluster in the medium of the upper confinement, as in FIG. 2A. FIG. 12B shows an actual fruit tree (*Punica* spp, AKA pomegranate) as depicted in FIG. 2B, having a differential altitude and distributed root system generated according to the methods of the present invention, at a more advanced stage of development, showing the plant's thriving stems and foliage growing in the upper confinement from the root cluster induced therein.

Figure 12C:
Figure 12D:

FIGS. 12C and 12D are photographs of actual *Vitis* spp. (AKA Grape vines) plants, generated according to the same methods as used to generate the plant as in FIGS. 2A and 12A. FIG. 12C shows the induction of a root cluster in the upper confinement, and FIG. 12D shows the actual, thriving grape vine (*Vitis* spp.) having a differential altitude and distributed root system generated according to the methods of the present invention, at a more advanced stage of development, as illustrated in FIGS. 2B and 12B.

In air layering, a target region of a branch is wounded and surrounded in a moisture-retaining wrapper, such as, but not limited to, sphagnum moss, which is further surrounded in a moisture bather, such as, but not limited to, a polyethylene film. When sufficient roots have grown from the wound, the wrapper is removed and the novel root cluster is planted in soil, or alternatively, soil or soil replacement (e.g., potting mix) is added to support root growth.

In soil layering, a target region of a branch is wounded and placed in soil or soil replacement to induce root growth in situ.

In either case, a rooting hormone, such as, but not limited to, abscisic acid (ABA), 1-Naphthaleneacetic acid (NAA) and/or 1-Naphthaleneacetamide, may be applied to encourage the wounded region to grow roots.

As shown in FIGS. 4A-B, according to an aspect of some embodiments of the present invention there is provided an alternative method of generating plant 10. Also according to this method plant 10 has a differential altitude and distributed root system 12. The method according to this aspect of the invention comprises planting a first plant 10a having a first root cluster 12a in a first confinement 14a. The method according to this aspect of the invention further comprises planting a second plant 10b having a second root cluster 12b in a second confinement 14b. The method according to this aspect of the invention further comprises inducing a branch 16a of first plant 10a to functionally fuse to a branch 16b of the second plant, so as to functionally connect plants 10a and 10b into a single plant 10. According to this aspect of the invention first confinement 14a and second confinement 14b are at different altitudes, thereby generating plant 10 having a differential altitude and distributed root system 12.

Functional fusion of branches 16a and 16b may be carried out by a process known as inosculation, whereby branches merge as a result of their cambiums grafting together slowly as they grow adjacent to each other.

As shown in FIGS. 5A-B, according to an aspect of some embodiments of the present invention there is provided yet another method of generating plant 10 having a differential altitude and distributed root system 12. According to this aspect of the invention, the method comprises planting a plant 10a having a root cluster 12a in a first confinement 14a. According to this aspect of the invention the method further comprises inducing a branch 18 of root cluster 12a to generate an additional root cluster 12b in a second confinement 14b. First confinement 14a and second confinement 14b are at different altitudes, thereby generating plant 10 having differential altitude and distributed root system 12. Optionally, according to this aspect of the invention the method further comprises inducing additional root cluster 12b to generate a stem 20 and a foliage cluster 22.

As shown in FIGS. 6A-B, according to an aspect of some embodiments of the present invention there is provided yet another method of generating plant 10 which has a differential altitude and distributed root system 12. According to this aspect of the invention the method comprises planting a first plant 10a having a first root cluster 12a in a first confinement 14a. According to this aspect of the invention the method further comprises planting a second plant 10b having a second root cluster 12b in a second confinement 14b. According to this aspect of the invention the method further comprises inducing a branch 24a of first root cluster 12a to functionally fuse to a branch 24b of second root cluster, so as to functionally connect, via a connecting root 24, plants 10a and 10b into a single plant 10. According to this aspect of the invention first confinement 14a and second confinement 14b are at different altitudes, thereby generating plant 10 having a differential altitude and distributed root system 12.

Various plant structures can be used for generating a plant having a differential altitude and distributed root system. Thus, according to some embodiments of the present invention there is provided still another method of generating a plant having a differential altitude and distributed root system. According to this aspect of the invention the method comprises first obtaining a plant having a root cluster in a first confinement, and inducing a structure of the plant to generate an additional root cluster in a second confinement. According to this aspect of the invention, the first confinement and second confinement are located at different altitudes. According to another aspect of the present invention, the method may be repeated with the plant grown in the first or the second confinement, or both, to provide a method of generating a plant having a plurality of different altitudes and distributed root systems.

According to some embodiments of the present invention there is provided still another method of generating a plant having a differential altitude and distributed root system. According to this aspect of the invention the method comprises obtaining a first plant having a root cluster in a first confinement and a second plant having a second root cluster in a second confinement and inducing a portion of a structure of the first plant to functionally fuse with a portion of a structure of the second plant, where the first confinement and said second confinement are at different altitudes, generating a plant having a different altitudes and distributed root systems. According to another aspect of the present invention, the method may be repeated with the plant grown in the first or the second confinement, or both, to provide a method of generating a plant having a plurality of different altitudes and distributed root systems. According to this aspect of the invention, the plant structure is selected from the group consisting of a root, a stem and a shoot. In some embodiments, the structure of the first plant is a root and the structure of the second plant is a root, and the roots are induced to functionally fuse. In other embodiments, the structure of the first plant is a root and the structure of the second plant is a shoot, and the root and shoot are induced to functionally fuse. In yet other embodiments, the structure of the first plant is a root and the structure of the second plant is a stem, and the root and stem are induced to functionally fuse.

In some embodiments, the structure of the first plant is a shoot and the structure of the second plant is a shoot, and the shoots are induced to functionally fuse. In other embodiments, the structure of the first plant is a shoot and the structure of the second plant is a root, and the shoot and root are induced to functionally fuse. In yet other embodiments, the structure of the first plant is a shoot and the structure of the second plant is a stem, and the shoot and stem are induced to functionally fuse.

In other embodiments, the structure of the first plant is a stem and the structure of the second plant is a stem, and the stems are induced to functionally fuse. In other embodiments, the structure of the first plant is a stem and the structure of the second plant is a root, and the stem and root are induced to functionally fuse. In yet other embodiments, the structure of the first plant is a stem and the structure of the second plant is a shoot, and the stem and shoot are induced to functionally fuse.

It will be appreciated that, in some embodiments of the present invention, multiple or a plurality of plant structures can be induced to functionally fuse. For example, in some embodiments, generating a plant having a differential altitude and distributed root system comprises obtaining a first plant having a root cluster in a first confinement and a second plant having a second root cluster in a second confinement and inducing a portion of at least two structures of the first plant to functionally fuse with a portion of at least two structures of the second plant, where the first confinement and said second confinement are at different altitudes, generating a plant having a different altitudes and distributed root systems, comprising a plurality of plant structures having vascular connections between the parts of the plant in the first and second confinements. The at least two structures of the first plant can be identical structures (at least two stems, at least two shoots, etc), or different structures (at least one stem and at least one shoot, at least one root and at least one stem, etc), or combinations thereof. The at least two structures of the second plant can also be identical structures (at least two stems, at least two shoots, etc), or different structures (at least one stem and at least one shoot, at least one root and at least one stem, etc), or combinations thereof.

Thus, for example, in some embodiments a plant having different altitudes and distributed root systems, comprising a plurality of plant structures having vascular connections between the parts of the plant in the first and second confinement can be generated by inducing fusion between a shoot of the first plant and a stem of the second plant, AND additionally inducing fusion between a root of the first plant and a shoot of the second plant, producing a plant having different altitudes and distributed root systems, comprising a plurality of plant structures having vascular connections between the parts of the first and second confinements. According to some embodiments, the at least two structures of the first and second plants can be two, three, four, five or more structures, and the plurality of plant structures having vascular connections between the parts of the plant in the first and second confinements can include two, three four, five or more structures having vascular connections between the parts of the plant in the first and second confinement. Such plant having a plurality of plant structures having vascular connections between the parts of the plant in the first and second confinements may benefit from additional vascular connection between the parts of the plant at different altitudes, enabling, inter alia, effective bidirectional movement of nutrients and fluids between the parts of the plants in the first and second confinements.

It will be appreciated that, as in the other methods described herein, such a method for generating a plant having a plurality of plant structures having vascular connections between the parts of the plant in confinements of different altitudes can optionally be performed using not only a first and second but also a third and fourth or more confinements concurrently.

According to another aspect of the present invention, the portion of the structure that is induced to generate a root cluster, or functionally fuse to a portion of a structure of the second plant is in vascular connection with the structure.

It will be appreciated that in some embodiments of the present invention, generating a plant having different altitudes and distributed root systems or a plurality of plant structures having vascular connections between the parts of the plant in confinements of different altitudes can be achieved by using more than one structure, or more than one portion of a structure according to the methods of the present invention. Thus, in some embodiments of the invention, two, three, four or more shoot, stem or root structures of the plant in the first confinement may be induced to generate a second root cluster in the second confinement. Further, in some embodiments of the invention, two, three, four or more shoot, stem or root structures of the plant in the first confinement may be induced to fuse in vascular connection with the structure, structures, or portions thereof of the second plant in the second confinement.

As shown in FIGS. 7A-B, 8A-B and 9, according to an aspect of some embodiments of the present invention, there is provided a single plant 10, which comprises a differential altitude and distributed root system 12; a foliage system 26; and at least one stem 28 connecting between root system 12 and the foliage system 26.

In FIGS. 7A, 8A and 9, plant 10 has a distributed foliage system 26. Distributed foliage system 26 can be a differential altitude and distributed foliage system.

In FIGS. 7B and 8B, foliage system 26 is not distributed and hence more sizeable.

In FIGS. 7A, 7B a branch 30 is connecting between two plant clusters.

In FIGS. 8A and 8B a root branch 32 is connecting between two plant clusters.

In FIG. 9 a fused branch 34 is connecting between two plant clusters.

With reference now to FIGS. 10A-B, according to an aspect of some embodiments of the present invention there is provided a method of generating elevating living facade 40. The method comprises growing at least one plant 10 having a distributed root system 12 over or adjacent to a surface 42 of an elevating facade 40, thereby generating the elevating living facade 40.

According to an aspect of some embodiments of the present invention there is provided a living facade 40 which comprises a surface 42 and at least one single plant 10 grown on or adjacent to the surface. The single plant comprises a distributed root system; a foliage system; and at least one stem connecting between said root system and said foliage system.

According, but not limited, to the latter two aspects, distributed root system 12 can be either a same (FIG. 10A)—or alternatively a differential—altitude (FIG. 10B) and distributed root system, the distributed root system can therefore be contained in a plurality of a same (FIG. 10A)—or alternatively a differential—altitude (FIG. 10B) and distributed confinements 14a, 14b, confinements 14a, 14b are attached to or integrally formed with or in or on surface 42.

As shown in FIGS. 7A-10B, according to some embodiments of the invention, living facade 40 is formed on a wall 50.

According to some embodiments of the invention, the wall is a part of a man made structure 70.

According to some embodiments of the invention, the plant is a tree.

According to some embodiments of the invention, the tree is a fruit tree.

According to some embodiments of the invention, the fruit tree is selected from the group consisting of *Vitis* spp. AKA Grape vines, *Malus* spp., in particular *Malus domestica*, AKA Apple, *Prunus* spp., AKA Peach, Plum, Cherry, Apricot, *Pyrus* spp. AKA Pear, *Vaccinium* spp., AKA Blueberry, Cranberry, Bilberry, *Ribes* spp., AKA currants e.g. Blackcurrant, Redcurrant, *Asimina* sp., AKA Pawpaw, *Punica* spp., AKA Pomegranate, *Ficus* spp., AKA Fig, *Diospyros* spp., AKA Persimmon, *Olea* spp., AKA Olive.

FIG. 11 shows a building with a living facade according to the present invention, exemplifying how single plants, four tees in this case, can be distributed across and along the entire facade of a building. In FIG. 10 two single lemon trees cover one side of the facade, whereas two single orange trees cover the other side of the facade.

Some plants may require continuous root growth in order to maintain viability. In such cases, extra confinements may be constructed to allow future use and root growth.

When a root cluster of a plant of the invention fills up the confinement in which it grows, the root cluster may die. In this case, the growing medium in this confinement may be renewed and a new root cluster and foliage cluster grown therein using any one of the methods of the present invention.

In addition, in a case whereby a root cluster of a plant dies and as a result the plant parts into two independent plants, the two independent plants may be rejoined into a single plant using the methods of the present invention, e.g., the method described in FIGS. 4A-4B. In fact, any two pre-existing plants may be joined into a single plant using e.g., the method described in FIGS. 4A-4B.

The present invention allows for the first time the cultivation of large trees such as fruit trees on living facades. When grown as described herein, a tree with a differential altitude distributed root system and optionally a differential altitude distributed foliage system have its weight distributed over the area of the wall and will be fastened in many locations to the vertical surface, thus conferring greater structural stability and greater resilience to wind and weight induced load stresses.

Fruit trees are particularly suited for cultivation on living facades where agricultural produce is desired, since, unlike many other crop plants, many species of fruit trees are capable of surviving through periods of cold temperatures without special attention and sheltering (overwintering).

It is expected that during the life of a patent maturing from this application many relevant plants and facades will be developed and the scope of the terms plant and facade are intended to include all such new technologies a priori.

The terms "comprises", "comprising", "includes", "including", "having" and their conjugates mean "including, but not limited to".

The term "consisting of" means "including and limited to".

The term "consisting essentially of" means that the method or structure may to include additional ingredients, steps and/or parts, but only if the additional ingredients, steps and/or parts do not materially alter the basic and novel characteristics of the claimed method or structure.

As used herein, the singular form "a", "an" and "the" include plural references unless the context clearly dictates otherwise.

As used herein the term "method" refers to manners, means, techniques and procedures for accomplishing a given task including, but not limited to, those manners, means, techniques and procedures either known to, or readily developed from known manners, means, techniques and procedures by practitioners of the horticulture art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A living facade comprising a surface and a single tree grown on or adjacent to said surface, wherein said single tree comprises:
   a differential altitude and distributed root system;
   a distributed, flowering and/or fruiting foliage system; and
   at least one stem connecting between said root system and said foliage system and wherein said distributed root system comprises a plurality of spatially separated root clusters, each root cluster contained in one of a plurality of differential altitude distributed confinements, said confinements attached to or integrally formed with or in or on said surface, wherein each of said plurality of differential altitude distributed confinements provides less soil volume than required by the root system of said single tree to support flowering and/or fruiting of said single tree.

2. The living facade of claim 1, wherein said distributed foliage system is a flowering or fruit-bearing foliage system.

3. The living facade of claim 1, formed on a wall.

4. The living facade of claim 3, wherein said wall is a part of a man made structure.

5. The living facade of claim 1, wherein said tree is a fruit tree.

6. The living facade of claim 5, wherein said fruit tree is selected from the group consisting of *Vitis* spp. AKA Grape vines, *Malus* spp., AKA Apple, *Prunus* spp., AKA Peach, Plum, Cherry, Apricot, *Pyrus* spp. AKA Pear, *Vaccinium* spp., AKA Blueberry, Cranberry, Bilberry, *Ribes* spp., AKA currants e.g. Blackcurrant, Redcurrant, *Asimina* sp., AKA Pawpaw, *Punica* spp., AKA Pomegranate, *Ficus* spp., AKA Fig, *Diospyros* spp., AKA Persimmon, *Olea* spp., AKA Olive.

7. The living façade of claim 6, wherein said fruit tree is *Malus domestica*.

8. The living facade of claim 5, wherein said tree is *Vitis* spp. AKA Grape vines.

9. A method of generating an elevating living facade, the method comprising growing a single tree having at least one differential altitude and distributed root system and flowering and/or fruiting distributed foliage system, the growing comprising:
   (a) obtaining a tree having a root cluster in a first confinement;
   (b) inducing a structure or portion thereof of the tree to generate an additional root cluster and foliage in a second confinement, said first confinement and said second confinement being at different altitudes, thereby generating a tree having a differential altitude and distributed root system and flowering and/or fruiting distributed foliage system,
   wherein said tree having a differential altitude and distributed root system and flowering and/or fruiting distributed foliage system is grown over or adjacent to a surface of an elevating façade, wherein said confinements are attached to or integrally formed with or in or on said surface and wherein each of said plurality of differential altitude distributed confinements provides less soil volume than required by the root system of said single tree to support flowering and/or fruiting of said tree
   thereby generating the elevating living facade.

10. The method of claim 9, wherein said structure is selected from the group consisting of a root, a stem and a shoot, and wherein said structure is in vascular connection with said structure.

11. The method of claim 9, wherein said tree is a fruit tree.

12. The method of claim 11, wherein said fruit tree is selected from the group consisting of *Vitis* spp. AKA Grape vines, *Malus* spp., AKA Apple, *Prunus* spp., AKA Peach, Plum, Cherry, Apricot, *Pyrus* spp. AKA Pear, *Vaccinium* spp., AKA Blueberry, Cranberry, Bilberry, *Ribes* spp., AKA currants e.g. Blackcurrant, Redcurrant, *Asimina* sp., AKA Pawpaw, *Punica* spp., AKA Pomegranate, *Ficus* spp., AKA Fig, *Diospyros* spp., AKA Persimmon, *Olea* spp., AKA Olive.

13. The method of claim 12, wherein said fruit tree is *Malus domestica*.

14. The method of claim 11, wherein said tree is *Vitis* spp. AKA Grape vines.

15. The method of claim 9, further comprising repeating steps (a)-(b) with said tree in said first or said second confinement or both with a plurality of additional trees having root clusters in a plurality of confinements, thereby generating a living façade comprising a tree having a plurality of differential altitudes and distributed root systems and distributed flowering and/or fruiting foliage systems.

16. A method of generating an elevating living facade, the method comprising growing a single tree having a differential altitude and distributed root system, the growing comprising:
(a) obtaining a first tree having a first root cluster in a first confinement;
(b) obtaining a second tree having a second root cluster in a second confinement;
(c) inducing a structure or portion thereof of the first tree to functionally fuse to a structure or portion thereof of the second tree, said first confinement and said second confinement being at different altitudes, thereby generating a tree having a differential altitude and distributed root system,
wherein said tree having a differential altitude and distributed root system is grown over or adjacent to a surface of an elevating façade, wherein each of said plurality of differential altitude distributed confinements provides less soil volume than required by the root system of said single tree to support flowering and/or fruiting of said tree and wherein said confinements are attached to or integrally formed with or in or on said surface, thereby generating the elevating living facade.

17. The method of claim 16, wherein said structure is selected from the group consisting of a root, a stem and a shoot and wherein said structure is in vascular connection with said structure.

18. The method of claim 16, wherein said structure of said first tree is a root and said structure of said second tree is a root.

19. The method of claim 16, wherein said structure of said first tree is a shoot and said structure of said second tree is a shoot.

20. The method of claim 16, wherein said structure of said first tree is a stem and said structure of said second tree is a stem.

21. The method of claim 16, wherein said tree is a fruit tree.

22. The method of claim 21, wherein said fruit tree is selected from the group consisting of *Vitis* spp. AKA Grape vines, *Malus* spp., AKA Apple, *Prunus* spp., AKA Peach, Plum, Cherry, Apricot, *Pyrus* spp. AKA Pear, *Vaccinium* spp., AKA Blueberry, Cranberry, Bilberry, *Ribes* spp., AKA currants e.g. Blackcurrant, Redcurrant, *Asimina* sp., AKA Pawpaw, *Punica* spp., AKA Pomegranate, *Ficus* spp., AKA Fig, *Diospyros* spp., AKA Persimmon, *Olea* spp., AKA Olive.

23. The method of claim 22, wherein said fruit tree is *Malus domestica*.

24. The method of claim 21, wherein said tree is *Vitis* spp. AKA Grape vines.

25. The method of claim 16, further comprising repeating steps (a)-(c) with said tree in said first or said second confinement or both, with a plurality of additional trees having root clusters in a plurality of confinements, thereby generating a living façade comprising a tree having a plurality of differential altitudes and distributed root system.

* * * * *